United States Patent Office 2,785,205
Patented Mar. 12, 1957

2,785,205

RECOVERY OF PHENOLS

David Ian Hutchinson Jacobs, Woodmansterne, England, assignor, by mesne assignments, to Hercules Powder Company, a corporation of Delaware No Drawing. Application July 1, 1954,
Serial No. 440,860

7 Claims. (Cl. 260—621)

The present invention relates to the manufacture of dihydric phenols, and in particular to the recovery and isolation of resorcinol prepared by the cleavage of meta-diisopropylbenzene dihydroperoxide.

Resorcinol may be prepared by the oxidation of meta-diisopropylbenzene to give an oxidate containing meta-diisopropylbenzene dihydroperoxide, from which the dihydroperoxide may be separated by extraction with alkali and subsequently decomposed to give a reaction product containing resorcinol. The resorcinol may be recovered from such a reaction product by distillation in the presence of an organic solvent. The solvent which is generally a high-boiling substance inert to the resorcinol such as, for instance, a chlorinated benzene, distils over with the resorcinol. On cooling, the resorcinol crystallizes out from the distillate and is separated off, while the high-boiling inert substance is recycled to the still.

I have now discovered that when a resorcinol-containing reaction product prepared as indicated above is subjected to distillation in the presence of a high-boiling inert substance, the distillate contains in addition to the resorcinol and the inert substance varying quantities of meta-isopropylphenol and meta-isopropenylphenol. These compounds are thought to be at least in part derived respectively from small amounts of meta-diisopropylbenzene monohydroperoxide and meta - (2 - hydroxy - 2 - propyl-) - α,α - dimethylbenzyl hydroperoxide which are extracted from the oxidate by the alkali and are therefore subjected to the decomposition process together with the dihydroperoxide. It has also been found that when the distillate, after recovery of the resorcinol and consisting of the inert substance together with meta-isopropylphenol, and meta-isopropenylphenol is recycled to the still the by-product phenols build up to a high level thereby altering the entraining and solubility characteristics of the inert substance, and preventing satisfactory recovery of the resorcinol. In addition, the meta-isopropenylphenol readily polymerises in the still, and this represents a loss where it is desired to recover the meta-isopropenylphenol as such.

I have further discovered that the meta-isopropylphenol and meta-isopropenylphenol can be removed from the distillate after the removal of the resorcinol therefrom, and before recycling the inert substance to an earlier stage in the process.

Accordingly, the present invention comprises the process for the manufacture of resorcinol by the catalytic decomposition of a reaction mixture containing meta-diisopropylbenzene dihydroperoxide together with small amounts of meta-diisopropylbenzene monohydroperoxide and/or meta-(2 - hydroxy - 2 - propyl-) - α,α - dimethyl-benzyl hydroperoxide followed by the distillation of the decomposition reaction product in the presence of a high-boiling substance which is substantially inert to resorcinol and by the removal of the resorcinol from the distillate, characterised in that the residue of the distillate is treated for the recovery of meta-isopropylphenol and meta-isopropenylphenol and is subsequently recycled to the reactor in which the catalytic decomposition is effected or to the still.

The entrainer may consist of any high-boiling substance which is substantially inert to the resorcinol and to the by-product phenols, and which is liquid at room temperature. It may form a minimum-boiling azeotrope with the resorcinol but other high-boiling substances which do not form azeotropes also give satisfactory results. However, substances which form maximum-boiling azeotropes with the resorcinol are not so suitable since the recovery of all the resorcinol in such a case will necessitate removing all the liquid substance from the distillation vessel with consequent baking of residues on to the surfaces and heating coils of the distillation vessel. The boiling point of the inert substance is preferably in excess of about 220° C. at atmospheric pressure, since at this temperature cracking of high-boiling condensation products containing resorcinol takes place with consequently enhanced yields of resorcinol. Suitable inert substances which may be mentioned include gas-oil (for instance a fraction boiling between 100 and 200° C. at 12 mm. Hg pressure), triisopropylbenzene, methylnaphthalene, chloronaphthalene, bromonaphthalene, 1:2:4-trichlorobenzene, and chlorinated diphenyls such as monochlorodiphenyl.

The amount of inert substance employed in a batch process may vary within wide limits but it should preferably be such that some remains in the kettle when all the dihydric phenol has been removed in order to prevent the formation of hard, insoluble tars on the walls and heating coils of the kettle. Although the by-products may be relatively insoluble in the inert substance the presence of the latter appears to prevent their deposition on the heating surfaces where they would subsequently become baked hard. In a batch distillation the tarry materials may be separated from the inert substance by decantation at the end of the distillation and the substance re-used; this is especially the case when naphthalene derivatives are employed as the inert substance.

The inert substance may be present during the step of decomposing the dihydroperoxide or it may be added to the crude product from this stage and the mixture after removal of any low-boiling materials submitted to distillation either at atmospheric pressure or under reduced pressure to recover the dihydric phenol. Alternatively, the decomposition product, stripped free from low-boiling materials may be fed, either alone or admixed with some of the inert substance into the column of a still up which the inert substance is being distilled and the dihydric phenol recovered overhead while the tarry by-products pass down the column into the kettle; such a system can, of course, be readily adapted to continuous working. A further method of operation is to feed the stripped cleavage product together with the inert substance into a stirred kettle from which the dihydric phenol is removed by distillation and the tarry by-products and part or all of the remainder of the inert substance fed are withdrawn intermittently or continuously from the kettle. Other methods of operation can, of course, be employed.

The distillate obtained is cooled to crystallise the resorcinol. It is desirable to operate the process so that the distillate, when hot, is homogeneous, and so that, on cooling, the resorcinol crystallises directly from solution rather than separating first as a molten resorcinol phase. This can be readily achieved by adjusting the proportion of inert substance in the mixture fed to the still so that distillate is not saturated with respect to resorcinol while still above the temperature at which crystallisation takes place. By carrying out the process in this way a purer sample of resorcinol results than would be obtained if the resorcinol were first allowed to separate as a liquid phase, since in the latter case some of the by-product phenols would tend to dissolve in the liquid resorcinol, giving rise to impure crystals of resorcinol.

The crystalline resorcinol may be removed from the distillate by filtration, and the crystals are advantageously washed with a low-boiling solvent such as low-boiling light petroleum, and dried. Small amounts of resorcinol remain dissolved in the distillate, and this is desirably recovered, for instance by washing with water, before the distillate is treated for the recovery of the by-product phenols. If the dissolved resorcinol is not removed it may prevent the satisfactory isolation of the by-product phenols. The additional resorcinol obtained in this way is usually of a low purity and may advantageously be recycled to the still, for instance, after evaporation of the water, or after being extracted with a suitable low-boiling inert organic solvent from which it is obtained by any suitable means, such as by evaporation of the solvent.

After removal of all the resorcinol from the distillate, the residue of this is treated for the recovery of meta-isopropylphenol and meta-isopropenylphenol.

The by-product phenols may be recovered from the residue of the primary distillate by treating the latter to polymerise the meta-isopropenylphenol. This can be achieved by treating the distillate with, for instance, an acidic catalyst such as an acid clay, or with mineral acids not miscible with the inert substance, followed by heating the mixture to complete the polymerisation. Suitable acidic surface active clay catalysts include montmorillonites, bentonites, fuller's earths, vermiculites, attapulgites, kaolinites and illites in their acid-activated forms. The meta-isopropenylphenol polymer can then be isolated by distilling off the inert substance and the meta-isopropylphenol. The meta-isopropylphenol can subsequently be recovered from the inert substance by alkali extraction. This may be achieved by extracting the meta-isopropylphenol from the inert substituent using an aqueous alkali solution. The concentration of alkali used is not critical, and solutions of 4 to 8% weight/volume sodium hydroxide have been found convenient. The extraction may be carried out batchwise or in a continuous extraction train. The meta-isopropylphenol may then be recovered from the alkali extract by acidification with mineral acids or with carbon dioxide whereby the meta-isopropylphenol is precipitated as an oil phase. This may be decanted, or removed by extraction with any suitable inert organic solvent, and fractionated to isolate the meta-isopropylphenol.

The inert substance having been isolated, it is then recycled to an earlier stage in the process, either continuously or in a batchwise manner. It is preferred to recycle to the still, but if desired the inert substance may be introduced into the process before the decomposition of the meta-diisopropylbenzene dihydroperoxide.

The proportions of meta-isopropylphenol and meta-isopropenylphenol, the latter in the form of its polymer, which are recovered from the distillate may vary widely, and will depend both on the conditions under which the original oxidation has been carried out and on the operating conditions of the subsequent extraction with alkali to separate the dihydroperoxide from the oxidate. Thus it has been found that when the oxidate providing the starting material for the catalytic decomposition reaction has been derived from the batchwise oxidation of meta-diisopropylbenzene to limited conversion the distillate ultimately resulting contains very little meta-isopropylphenol. On the other hand, if the oxidate has been derived from a continuous oxidation process, a rather higher proportion of meta-isopropenylphenol will be found. Similarly, if the alkali extraction of the oxidate is carried out using an excess of alkali the proportion of meta-isopropylphenol in the distillate ultimately obtained will be higher than if the bare minimum amount of alkali required for efficient extraction of the dihydroperoxide is used.

The following example illustrates the way in which the process of this invention may be carried out in practice.

*Example*

Crude meta-diisopropylbenezne dihydroperoxide containing small amounts of meta-diisopropylbenzene monohydroperoxide and meta-(2-hydroxy - 2 - propyl)-α,α-dimethylbenzyl hydroperoxide is decomposed in the presence of sulphuric acid. The product from the decomposition is neutralised, stripped of solvents, and distilled at atmospheric pressure with two to three volumes of methyl naphthalene. Fractions of the distillate are collected and cooled, the resorcinol which crystallises from the distillate being filtered off, and the filtrate returned to the distillation kettle. This process is continued until no more resorcinol crystallises from the distillate on cooling, after which the remainder of the methylnaphthalene in the kettle is distilled off.

The methylnaphthalene mother liquors are washed twice with small portions of water to remove traces of dissolved resorcinol. About 0.5% by weight of an acid-activated fuller's earth (grade 237, marketed by the Fuller's Earth Union, Redhill Surrey) is added to the mother liquors, which are then heated to 100° C. with stirring for 1 hour. The catalyst is filtered off and the filtrate is distilled at 10 mm. pressure leaving a residue of meta-isopropenylphenol dimer. The distillate, consisting of a solution of meta-isopropylphenol in methylnaphthalene, is extracted twice with about ⅓ volume of 8% sodium hydroxide solution, the combined alkali extracts washed twice with small portions of ether, and the extracts acidified with carbon dioxide. After acidification, the produce is extracted with ether, dried over anhydrous sodium sulphate, the ether removed and the residue distilled to give a distillate of meta-isopropylphenol.

I claim:

1. In the process for the manufacture of resorcinol by the catalytic decomposition of a reaction mixture containing meta-diisopropylbenzene dihydroperoxide together with small amounts of a hydroperoxide of the group consisting of meta-diisopropylbenzene monohydroperoxide, meta - (2 - hydroxy-2-propyl)-α,α-dimethylbenzyl hydroperoxide and mixtures thereof, followed by distillation of the decomposition reaction products in the presence of a high boiling substance substantially inert to resorcinol, and collection of a distillate containing resorcinol, meta-isopropyl phenol, meta-isopropenyl phenol and said high boiling substance followed by separation of resorcinol from said distillate to leave a residue of the distillate which is recycled to the distillation step, the improvement whereby said residue of the distillate is freed of meta-isopropyl phenol and meta-isopropenyl phenol prior to recycle, which comprises heating said residue of the distillate under polymerization conditions until the meta-isopropenyl phenol is substantially completely polymerized, subsequently distilling the volatile fraction containing meta-isopropyl phenol and said high boiling substance from polymerized meta-isopropenyl phenol, and extracting the meta-isopropyl phenol from said volatile fraction by an aqueous alkali hydroxide solution.

2. The process as in claim 1 wherein the polymerisation is carried out by heating the residue of the distillate in the presence of an acidic catalyst.

3. The process as in claim 2 wherein the acidic catalyst is an acid clay.

4. The process as in claim 2 wherein the acidic catalyst is a mineral acid immiscible with the inert substance.

5. The process as in claim 1 wherein the meta-isopropylphenol is recovered from the alkaline extract by acidification and by extraction with an inert organic solvent.

6. The process as in claim 5 wherein the meta-isopropylphenol is isolated from the inert organic solvent by fractional distillation.

7. The process as in claim 5 wherein the meta-isopropylphenol is isolated from the inert organic solvent by fractional crystallisation.

References Cited in the file of this patent

UNITED STATES PATENTS

| | | |
|---|---|---|
| 1,873,900 | Miller | Aug. 23, 1932 |
| 1,912,628 | Elliott | June 6, 1933 |
| 2,006,517 | Seymour | July 2, 1935 |
| 2,628,983 | Aller et al. | Feb. 17, 1953 |

FOREIGN PATENTS

| | | |
|---|---|---|
| 641,250 | Great Britain | Aug. 9, 1950 |

UNITED STATES PATENT OFFICE

CERTIFICATE OF CORRECTION

Patent No. 2,785,205                                            March 12, 1957

David Ian Hutchinson Jacobs

It is hereby certified that error appears in the above numbered patent requiring correction and that the said Letters Patent should read as corrected below.

In the heading to the printed specification, between lines 7 and 8, insert the following:

--Claims priority, application Great Britain July 4, 1953--

Signed and sealed this 1st day of October 1957.

(SEAL)
Attest:
KARL H. AXLINE
Attesting Officer

ROBERT C. WATSON
                                                                        Commissioner of Patents